April 7, 1964  E. P. GRIFFIN ETAL  3,127,682
NADIR POINT DETERMINING INSTRUMENT
Filed Feb. 17, 1960  3 Sheets-Sheet 2

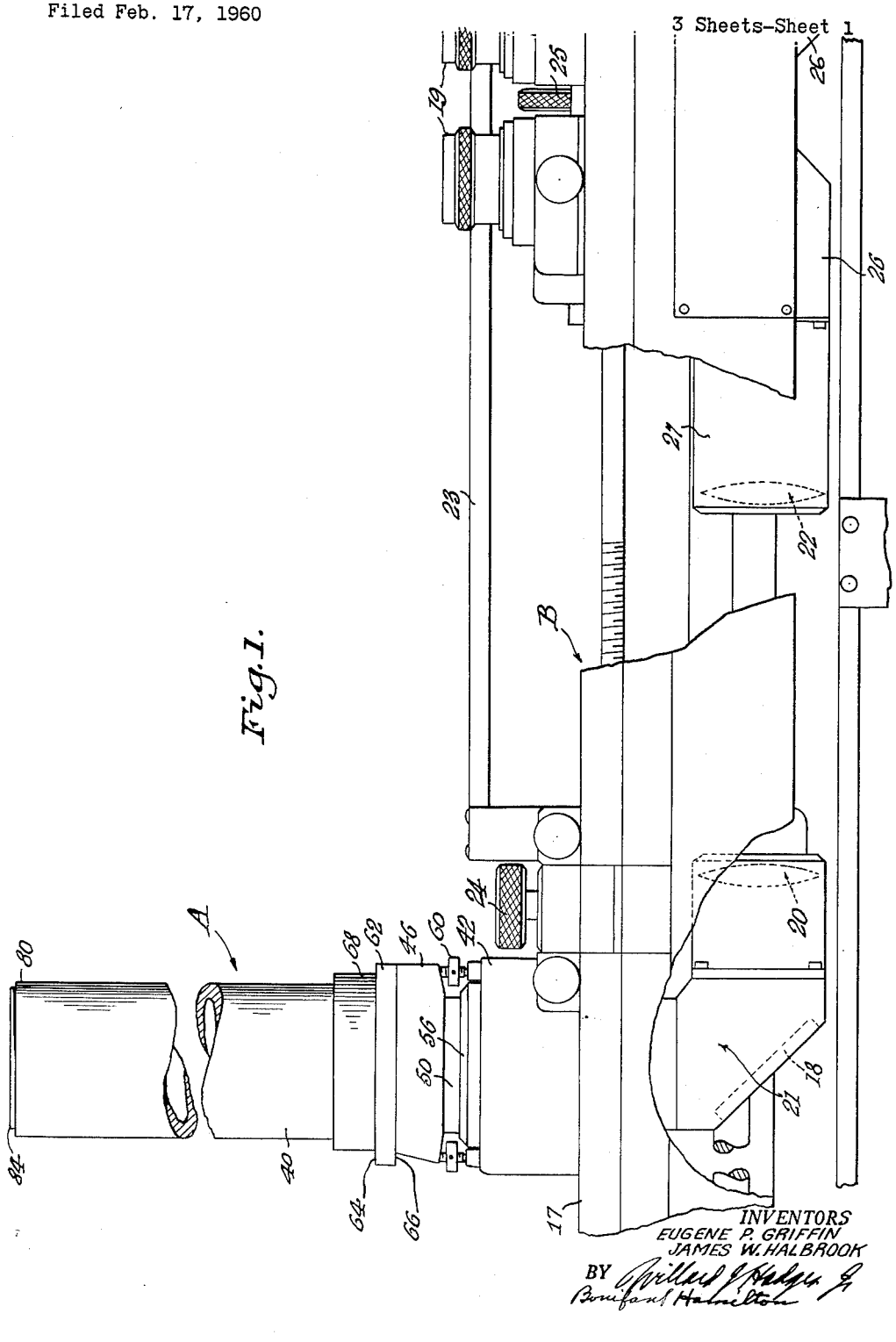

INVENTORS
EUGENE P. GRIFFIN
JAMES W. HALBROOK
BY
ATTORNEYS

April 7, 1964    E. P. GRIFFIN ETAL    3,127,682
NADIR POINT DETERMINING INSTRUMENT
Filed Feb. 17, 1960    3 Sheets-Sheet 3
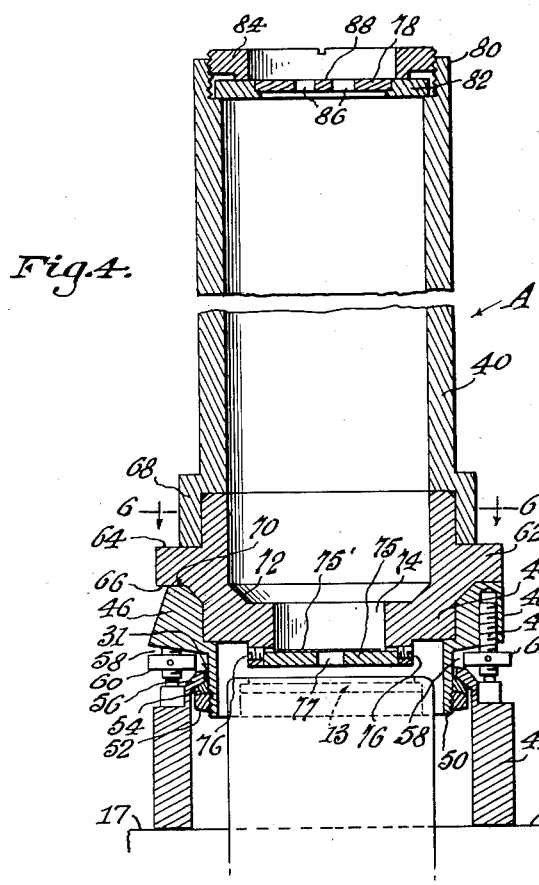
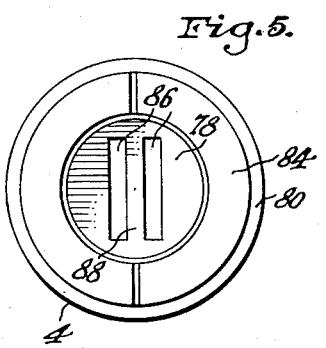
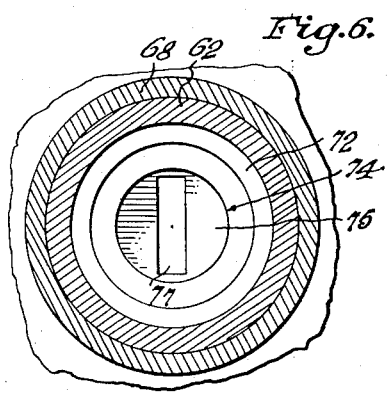
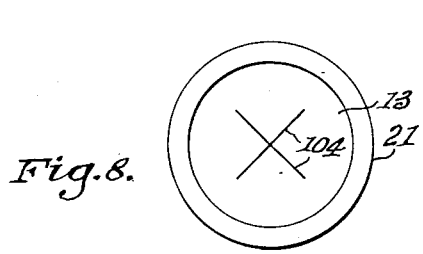
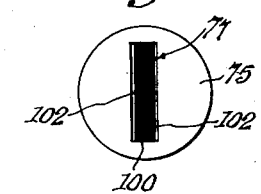
INVENTORS
EUGENE P. GRIFFIN
JAMES W. HALBROOK
BY
ATTORNEYS

United States Patent Office 3,127,682
Patented Apr. 7, 1964

3,127,682
NADIR POINT DETERMINING INSTRUMENT
Eugene P. Griffin, Springfield, and James W. Halbrook, Alexandria, Va., assignors to the United States of America as represented by the Secretary of the Army
Filed Feb. 17, 1960, Ser. No. 9,406
5 Claims. (Cl. 33—46)
(Granted under Title 35, U.S. Code (1952), sec. 266)

The invention described herein may be manufactured and used by or for the Government for governmental purposes without the payment of any royalty thereon.

The present invention provides improvements in a type of optical instrument which may be regarded as an optical plummet which is applicable for a wide variety of uses, such as, for example, in combination with a surveying instrument, wherein it may replace a conventional plumb bob in which a pointed weight is provided at the end of a string, the instrument of the present invention being used in combination with optical viewing instrumentalities to indicate a vertical line projected from an object to a given surface or the intersection of such a vertical line with a given surface; in other words, to employ in conjunction with an optical viewing system, an optical means for locating on the surface the point which is directly below an object which is spaced above such surface either stationarily or in movement relative to such surface. The instrument of the present invention can be more precisely set than the conventional plumb bob, is self-contained, and is simple and convenient to use.

However general is the applicability of the instant instrument in use for the location of the intersection of vertical lines with a planar surface, it may be said that possibly the principal application of optical plummet of the present invention is related principally to the art of photogrammetry or the making of maps from aerial photographs, and an outstandingly important application of the instrument is in the conversion of aerial photographs into maps so that the description of an exemplary embodiment of the instrument which follows hereinafter will be directed principally to such utility.

Since the photogrammetric art is the possibly principal application of the instrument of the present invention, it may be noted, first, that the characteristics of aerial photographs are to be understood at least generally if they are to be used intelligently in compiling maps. The fundamental point is that an aerial photograph is not a map. The basic reasons for this are that the photograph is a perspective projection of three-dimensional terrain on a two-dimensional plane, and it is almost impossible to expose the negative so that it is absolutely parallel to the corresponding ground plane, and also the fact that the camera lens is not entirely free from distortion.

The first of these reasons may be stated in photogrammetric terms as follows: image distortion exists in photographs due to ground relief and tilt. However, for practical purposes a photograph may be considered a map if the terrain included in the entire area of the photograph is flat, if the photograph is not tilted, and if the camera lens is precise. Since these conditions rarely exist together, it is necessary to convert to the "true" the distorted relationships between ground features.

In considering relief distortion, it may be assumed that the photograph is a truly vertical photograph having three aligned points on the ground, of which the mid-point is the intersection with the ground of the plumb line from the camera lens and may be called the "plumb point." The line connecting the plumb point with the camera lens is referred to as the "plumb line" and is also the camera axis. The extension of the plumb line to the plane of the photograph intersects this plane in a point which is the "principal point" or "nadir point," since it is the position at which the foot of the perpendicular from the lens strikes the plane of the photograph. This point also is the image of the plumb point on the photograph.

In the conversion of aerial photographs into accurate maps, it becomes necessary to obviate distortions in the photographs which are due to several causes including ground relief and tilt, in the latter instance the problem dealing with the perspective projection of features from a horizontal to an inclined plane; and since the nadir point of a photograph is the principal point thereof, distortional corrections arising from ground relief and tilt, which are required to be made in the conversion of such photographs into accurate maps, involve the accurate and rapid placement and relocation of this point.

The present invention provides an instrument for accomplishing this purpose in a more expeditious manner than has been possible heretofore. The instant invention, as has been noted above, is applicable to topographic mapping by means of stereophotographs of any description; that is to say, it is particularly applicable to topographic surveying and mapping in conjunction with stereophotographs of any size, focal length, and direction of exposure obtained by means of any known system such as projection of ray intersection, stereoscopy, or any other means known to the art.

In the surveying or reproduction of terrain, that is, areas of the earth's surface, the practices employed include taking photographs from an aircraft at certain distances apart, which photographs partly overlap so that each successive pair of films or plates constitutes a stereoscopic photograph of the territorial area photographed on the two plates. These stereoscopic pictures are placed in a stereoscope and the rays are caused to intersect in pairs in such a manner that the totality or integration of the intersections develops an optical model of the photographed territorial area, from which area a map can be drawn or a relief model of the section of the territory can be produced. This method encounters substantial difficulties because the pictures usually are taken at high elevations which practically amount to infinite distance, and in the reproduction, that is, the optical model, the complementary rays must be caused to intersect over the drawing or survey table. In such operations, it becomes necessary to know the accurate location of the camera with respect to the terrain photographed for accurate reproduction of the conditions existing at the time of exposure of the photographic plate or film when the picture was taken.

The present invention provides an optical instrument which is termed arbitrarily by the inventors as a "nadir-scope" for use in determining the nadir point of an aerial photograph or the like, for use in the plotting of aerial photographs and in the accurate conversion thereof into maps of a given terrain, or, in general, other general applications of the character which have been noted above.

A further object of the invention is to provide an optical instrument for determining nadir points of stereoplotter projectors, which instrument is adapted particularly for use in conjunction with a suitable viewing instrument, a specific illustrative example of such a viewing instrument being a "stereopontometer" such as is described and claimed in United States Letters Patent No. 2,791,151, issued May 7, 1957, to John T. Pennington, or other instruments employed for the plotting of aerial photographs, and including optical viewing instrumentalities or systems. War Department Technical Manual, TM 5–240, Aerial Photography, May 10, 1944, particularly FIG. 54 thereof, is illustrative of the projector support bars known and conventional in the art. The projectors are supported by structure which permits the projectors to be moved with respect to the platen assembly and also permits the projectors to be fixed at a particular point in space while permitting the platen assembly to be moved with respect thereto.

The "nadirscope" of the present invention utilizes the principle that when two points forming a line perpendicular to a surface are placed beneath a point source of light, the shadows of the points will be coincident when they are directly below the light, and by directing the shadow of a small bar on a slot directly below the bar, the size of which slot is only slightly larger than the shadow, two streaks of light pass on through the slot. When the intensity of the two light streaks is equal, the bar and slot are in perfect alignment with a point representing the nadir point. By the use of the instrument of the present invention, a great increase in the speed and accuracy of repeated recovery of this point is obtained.

The invention will be understood more readily by reference to the accompanying drawings, and the features of novelty will be pointed out in particularity in the appended claims.

In the accompanying drawings which illustrate a representative embodiment of the improved construction of the present invention which is shown in combination with fragmentarily or diagrammatic viewing instrumentalities:

FIG. 1 illustrates a diagrammatic side elevation of an optical viewing system which may be, generally, of any suitable optical construction, for example such as a stereopontometer similar to that described and claimed in the above-referred to Pennington Patent No. 2,791,151, the view showing an instrument constructed in accordance with the present invention mounted on the viewing instrument at the objective thereof, parts of both instruments being broken away to accommodate the assembly to the size of the sheet;

FIG. 4 is an enlarged vertical section of the instrument of the present invention taken along the longitudinal vertical axis thereof, and showing structural details of its mounting;

FIG. 5 is a top plan view of the upper end of the instrument of FIG. 4 taken in direction of the arrow of FIG. 4;

FIG. 6 is a transverse section through the present instrument, the view being taken on the line 6—6 of FIG. 4 looking in the direction of the arrows;

FIG. 7 is a plan view of a bottom end platen used in connection with the present construction; and FIG. 8 is a plan view of a further platen employed complementarily to that shown in FIG. 7.

Figures 2, 3:
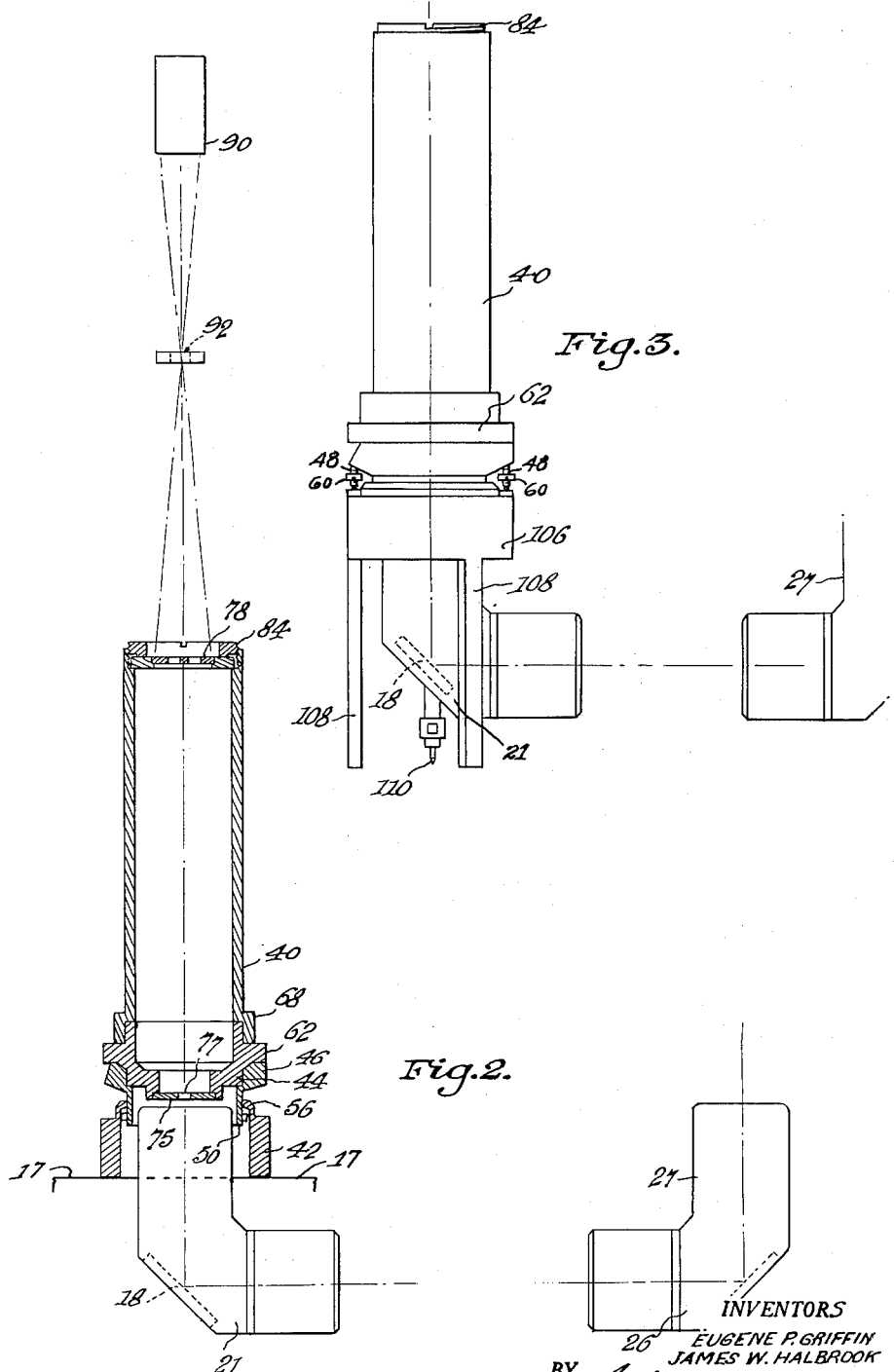
FIG. 2 is a further view of an assembly of instruments such as that shown in FIG. 1, the instrument of the instant invention being indicated in vertical axial section, the view indicating paths of light rays emanating from a light source and entering the instrument of the present invention.
FIG. 3 is a side elevation corresponding to FIG. 2 but with omission of certain elements included in FIG. 2, as being actually extraneous to the structure of the assembly desired to be shown in FIG. 3.

The accompanying drawings illustrate, by way of example, an adaptation of utility of the instrument of the present invention wherein the instrument of the instant invention is shown in conjunction with a viewing device such as, for example, a viewing instrument such as that constructed and illustrated by the above-identified Pennington patent; and as the structural and operational details of this patented instrument are disclosed fully in the aforesaid Pennington patent, detailed reference thereto in the instant description become unnecessary. It may be said, however, that the stereopontometer of the aforesaid Pennington patent as shown and being included in connection with the instant invention comprises a stereoscope having a binocular viewing device operatively mounted between a pair of longitudinally adjustable vertically disposed image-receiving screen units or platen units supported in space by a carriage slidably mounted upon a longitudinal track of a second carriage along which it may be moved to provide longitudinal movement to the stereoscope. The second carriage is provided with rollers which ride upon a lateral track provided therefor in a base support along which the second carriage may be moved to provide lateral movement to the stereoscope. The above movements are provided for moving the stereoscope into a position under a pair of projected images where the platen units may be adjusted longitudinally to receive the projected images for stereoscopic viewing through the stereoscope. In view of the above-referred to Pennington patent, the fragments of the stereopontometer which are indicated on the accompanying drawings are numbered rudimentarily only.

In the drawings, the instrument of the instant invention is indicated generally at A, which is shown as being assembled wtih a viewing instrument, such as stereopontometer B, the structural and operational details of which are set forth in the above-refered to Pennington patent, the instrument A being positioned at the objective opening of the viewing instrument B. There are shown on the drawings, however, an outer housing 17, binocular eye-pieces 19 provided with an adjusting screw assembly 25, the eye-pieces 19 being shown on the drawings as being positioned in housings 26 which also contain requisite optical equipment indicated collectively by 27, and including suitable lenses 22, which, in conjunction with corresponding lenses 20 which are located in platen housing 21, which is enclosed by the outer housing 17. Lenses 20 and 22, together with mirrors 18, transmit an image cast on platen 13 to binocular eye-pieces 19 through which the said image cast on platen 13 may be viewed. The drawings also include a platen clamp assembly 24 and a vernier assembly 23.

It will be understood that the accompanying drawings are intended to show only a highly specific exemplary embodiment of the construction of the instant invention which is illustrated as comprising a nadir-indicating or locating optical tube 40 which is illustrated on the drawings as being mounted vertically on the outer housing 17 and in light-transmitting relation with an objective opening in housing 21 of viewing device of stereopontometer B.

The tube 40 which embodies the instant invention is mounted on the aforesaid outer housing 17 in light-transmitting relation with the platen housing 21 by coupling means comprising an annular cupped leveling base 42 in which is seated a locating base 44, which is provided with a collar 46 which receives adjusting screws 48 which may be specifically three in number, and which bear against the base 42 and the collar 46 has an annular externally threaded cylindrical apron portion 50 for receiving an annular locking nut 52, which retains a washer 54 between itself and an annular lip 56 of the leveling base 42. This lip 56 and collar 46 of leveling base 42 have engaging complemental, downwardly sloping surfaces, the lip 56 and collar 14 defining an intervening channel 58 in which are located the operating heads 60 of the adjusting screws 48. The space 31 and beveled configuration of the upper surface of the washer 54 and the beveled under surface of the lip 56 which engages the beveled surface of the washer 54 permit tilting adjustment between the leveling base 42 and the collar portion 46 for tilting adjustment of the tube 40 because of relative movement between the washer 54 and the portion 56 responsive to actuation of the heads 60 of the adjusting screws 48.

The leveling base 42 receives the locating base 44, this latter having a substantially centrally disposed flange 62, the upper and lower surfaces 64, 66, of which define planar surfaces respectively abutting lower end portion 68 of tube 40 and top surface 70 of leveling base 42. The locating base 44 has an inwardly tapered portion 72 which opens into a centrally disposed opening 74 having its bottom closed by a plate or reticle 75 removably secured in position by locking screws 76 and provided with a centrally disposed slot 77 which operates in conjunction with a top plate or reticle 78 mounted adjacent to the top end 80 of the tube 40, and which is held is position by an annular holder 82 and retaining nut 84. A transparent member 75', on which a cross-hair, or other index is inscribed, is mounted adjacent, above or below, the reticle 75. The top reticle 78 is provided with two parallel and equal slots 86 which define between them a solid central bar 88 that is positioned directly above and parallel to the slot 77 in the bottom plate or reticle 75, but which is slightly narrower than the bottom slot 77.

The tube 40 passes, without reflectance, beams of light emanating from a condenser lens-light source combination indicated schematically as consisting of light source 90 and a lens 92 arranged vertically whereby lens 92 becomes in effect a point source of light. Housing 90 and lens 92 correspond to the projectors shown in FIG. 2 of the aforementioned Pennington patent and as disclosed therein are mounted in a conventional manner permitting the platen assembly to be removed without moving the projectors.

The bottom slot 77 in the bottom reticle plate 75 is slightly wider than the above-mentioned top bar 88 in the top reticle plate, so that when illuminated by the light source in housing 90, the bar 88 will cast a shadow 100 in the slot 77, which shadow is bounded by parallel light streaks 102 that correspond to the top slots 86. Although a bar 88 is shown in the illustrated embodiment for casting a shadow in the slot 77, it is to be understood that other configurations may be used, for example a cross or a circle. The images of these streaks are cast on opal glass platen 13 on which reference marks 104 are scribed in two directions.

The location of the nadir point, for example on the platen 13 of the stereopontometer, is accomplished by first adjusting the adjusting screws 60 to center the reference marks 104 beneath the bar 88 and slot 77. The cross-hairs or other reference index inscribed on the transparent member 75' aid in accomplishing this adjustment. The outer stereopontometer housing 17, carrying the tube 40, and the housing 21, carrying platen 13, are then moved in one direction, X-axis for example this motion being relative to point source of light 92, by a control means on the stereopontometer until the parallel streaks of light 102 are of equal intensity and the stereopontometer adjustment for this direction is locked. The tube 40 of the nadirscope is then rotated 90° and the stereopontometer is moved in the Y-axis direction by a control on this latter instrument until the parallel streaks of light 102 are again of equal intensity and the Y-axis control locked. The nadir point on the platen 13 of the stereopontometer or other optical instrument used in conjunction with the nadirscope is thus located. The adjusting screws 60 are also used to raise and lower the tube 40 in a vertical direction.

This is the procedure as used in the stereopontometer, and by providing such instrument for each platen of the stereopontometer, the platen separation can be set readily and accurately exactly equal to the separation of the centers of the projector lenses described in the Pennington patent referred to above.

It will be seen from the drawings that the present instrument is designed so as to be easily mounted on a stereopontometer without interfering with the operation thereof. The base 42 is secured rigidly to outer housing 17, and the tube 40 engages the base through the precision coupling described above herein which allows the tube 40 to be placed easily on the base 42 and rotated through 360 degrees without binding or imparting any motion other than true rotation about the axis of the tube.

The base 42 is provided with the leveling screws 48 as are necessary to level the base, plumb the tube, and center the slot 76 and bar 88 over the platen reference marks 104. In practice, the length of the slot 76 is approximately 25 mm. with a width of approximately 6 mm. The bar 88 is dimensioned so that its shadow will nearly, but not completely, fill the slot 76 as viewed in the platen 13 through the eye-pieces 19 of the optical system. The base 42 does not project sufficiently above the level of the platen 13 to interfere with the light being projected on the platen 13 when the tube 40 is removed. The interior of the tube 40 preferably should be anodized to minimize reflection.

Instead of employing the above-described base, there may be employed a tripod mounting designated by 106 (see FIG. 3) having equal legs 108 and a point marker 110, mounted in such a manner that when dropped on a plotting sheet or reference sheet on a flat table surface, it would indicate the nadir point. Otherwise, the construction of the tube 40 and the mounting structure therefor are substantially identical with the foregoing description.

It may be pointed out that the foregoing description, taken in conjunction with the accompanying drawings, represents preferred embodiments of the instant construction; but it will be apparent that structural details may be varied as may be needed to adapt it to varying operating circumstances and environment; and accordingly, it will be understood that it is intended and desired to include within the scope of the invention such modifications and changes as may be necessary or desirable to adapt the construction to varying conditions and uses, as defined in the appended claims.

We claim:

1. An optical instrument for locating a point on a surface directly beneath a point source of light above the surface, which comprises the combination with an optical viewing system and a light source for illumination thereof, of a tubular member rotatably mounted on the viewing system and beneath the light source, the tubular member having an upper end and a lower end, a top reticle in the tubular member adjacent to the upper end thereof and defining a top longitudinal central bar laterally bounded by slots of equal lengths and widths, a bottom reticle in the bottom end of the tubular member and having a bottom slot therein parallel to the central bar of the top reticle, the slot in the bottom reticle being slight larger in dimensions than the central bar in the top reticle, so that a shadow of the top central bar cast in the bottom slot by the source of illumination substantially fills the bottom slot but is bounded laterally by streaks of light from the top slots, a housing for a platen, the platen in the housing being in the optical viewing system and positioned below the bottom reticle in the tubular member, coupling means connecting the housing and the tubular member for mounting the latter vertically on the housing while enabling free and full rotation of the tubular member with respect to the housing in both forward and reverse directions, selectively, and cross-hair markings on the platen appearing on the platen when viewed through the viewing system, an image of the markings on the platen together with a shadow of the central bar of the upper reticle in the tubular member almost completely filling an image of the slot in the bottom reticle and the markings on the platen, the image of the shadow of the central bar and markings on the platen being bounded by light streaks having equal intensities when the light source bar, slot, and markings assume exact alignment responsively to horizontal movement of the tubular member and viewing system as a unit.

2. An optical instrument for locating a point on a surface directly beneath a point source of light above the surface which comprises, in combination, a tubular member having an upper end and a lower end, a top reticle in the tubular member adjacent to the upper end thereof and defining a top longitudinal central bar laterally bounded by slots of equal lengths and widths, a bottom reticle in the bottom end of the tubular member and having a bottom slot therein parallel to the central bar of the top reticle, the slot in the bottom reticle being only slightly larger than the central bar in the top reticle so that a shadow of the top central bar formed in the bottom slot substantially fills the bottom slot but is bounded laterally by streaks of light from the top slots, and connecting instrumentalities for the tubular member adapted to mount the tubular member in upright position on exterior viewing instrumentalities, the connecting instrumentalities including means enabling the tubular member to be adjusted with respect to the viewing instrumentalities.

3. An instrument as claimed in claim 2 wherein the connecting instrumentalities for the tubular member include a leveling base having a collar portion and a cylindrical apron portion depending from the collar portion and enclosing upper housing portions of the exterior viewing instrumentalities, a locating base for the tubular member extending into the leveling base and including flange means seated on the collar portion of the leveling base, the flange means also being a seat for the tubular member, and leveling and centering means mounted in the leveling base and operating abuttingly against the flange means of the locating base for leveling and centering the locating base and tubular member with respect to the housing portions of the exterior viewing instrumentalities.

4. An instrument as claimed in claim 3 wherein the locating base includes an annular seating portion extending upwardly from the flange means of the locating base, the seating portion extending inwardly relative to the tubular member and abutting against complementary seating surfaces in the tubular member while enabling adjustment of the tubular member relative to the locating base.

5. An optical instrument for locating a point on a surface directly vertically beneath a point source of light above the surface, which comprises a tubular housing assembly, a recticle mounted in one end of said tubular housing and providing an elongated centrally disposed bar laterally bounded by slots of equal dimensions, a second reticle mounted in the opposite end of said tubular housing parallel to the first-mentioned reticle, the second reticle having a slot therein slightly larger than the centrally disposed bar and parallel thereto, and an optical system connected exteriorly to the tubular housing and including viewing means disposed relative to the housing for enabling the housing to be viewed interiorly responsive to passage through the housing of beams of light emanating from an external point source of light, the bar producing a shadow thereof in the slot of the second reticle, the shadow substantially filling the slot but being bounded laterally by streaks of light becoming of equal intensities responsively to relative movement of the tubular housing assembly relative to the external point light source until equal amounts of light pass through the slots in the first-mentioned reticle and are viewed through the viewing means.

References Cited in the file of this patent

UNITED STATES PATENTS

| | | |
|---|---|---|
| 547,423 | Driggs | Oct. 8, 1895 |
| 1,089,086 | Sikes | Mar. 3, 1914 |
| 1,266,525 | Otte | May 14, 1918 |
| 2,825,137 | Meetin | Mar. 4, 1958 |
| 2,897,718 | Kerr | Aug. 4, 1959 |